US008826075B2

(12) United States Patent
Katz et al.

(10) Patent No.: US 8,826,075 B2
(45) Date of Patent: Sep. 2, 2014

(54) SOLVING CONSTRAINT SATISFACTION PROBLEMS HAVING LOOSELY INTERCONNECTED SUB-PROBLEMS

(75) Inventors: Yoav Katz, Haifa (IL); Michal Rimon, Nofit (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/400,141

(22) Filed: Feb. 20, 2012

(65) Prior Publication Data
US 2013/0219215 A1 Aug. 22, 2013

(51) Int. Cl.
*G06F 11/00* (2006.01)
(52) U.S. Cl.
USPC .................. 714/25; 706/45; 706/46; 714/26
(58) Field of Classification Search
USPC ................................... 706/45, 46; 714/25, 26
See application file for complete search history.

(56) References Cited

U.S. PATENT DOCUMENTS

| 7,266,534 | B2 * | 9/2007 | Emek et al. | 706/45 |
|---|---|---|---|---|
| 7,333,968 | B2 | 2/2008 | Geller et al. | |
| 7,409,377 | B2 * | 8/2008 | Emek et al. | 706/46 |
| 2005/0222827 | A1 * | 10/2005 | Emek et al. | 703/2 |
| 2008/0270331 | A1 | 10/2008 | Taylor et al. | |
| 2010/0036787 | A1 | 2/2010 | Colena et al. | |
| 2010/0121795 | A1 | 5/2010 | Colena et al. | |
| 2010/0121802 | A1 | 5/2010 | Colena et al. | |
| 2010/0191688 | A1 * | 7/2010 | Chen et al. | 706/46 |
| 2010/0275062 | A1 * | 10/2010 | Ur | 714/32 |
| 2011/0173034 | A1 | 7/2011 | Riepshoff et al. | |

OTHER PUBLICATIONS

Thomas Ellman, "Abstraction via approximate symmetry", Proceeding IJCAI'93 Proceedings of the 13th international joint conference on Artifical intelligence—vol. 2, 1993.
Adir et al., "Genesys-Pro: Innovations in test program generation for functional processor verification", IEEE Design and Test of Computers, 21(2):84-93, 2004.
Adir et al., "Improving test quality through resource reallocation", In Proceedings of the High-Level Design Validation and Test Workshop, pp. 64-69, 2001.
Bin et al., "Using a constraint satisfaction formulation and solution techniques for random test program generation", IBM Systems Journal, 41(3):386-402, 2002.
Chen et al., "Stratified planning", In Proceedings of the International Joint Conference on Artificial Intelligence, pp. 1665-1670, 2009.

(Continued)

*Primary Examiner* — Joshua P Lottich
(74) *Attorney, Agent, or Firm* — Ziu Glazberg (57) ABSTRACT

A method, apparatus and product. The method comprising automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly: (1) propagating constraints of the abstract CSP to reduce domains of the abstract CSP; (2) selecting a sub-problem to solve; (3) solving the sub-problem; and (4) updating the abstract CSP with values in accordance with the solution of the sub-problem. Whereby, a solution to the formally defined problem is determined based on the solutions to the sub-problems.

20 Claims, 5 Drawing Sheets

(56) References Cited

OTHER PUBLICATIONS

Brafman and Domshlak, "Factored planning: How, when, and when not". Proceeding AAAI'06 Proceedings of the 21st national conference on Artificial intelligence—vol. 1, 2006.

Clarke et al., "Counterexample-guided abstraction refinement for symbolic model checking", J. ACM, 50(5):752-794, Sep. 2003.

Emek et al., "X-Gen: A random test-case generator for systems and SoCs", In IEEE International High Level Design Validation and Test Workshop, pp. 145-150, Oct. 2002.

Gutkovich and Moss, "CP with architectural state lookup for functional test generation", In Proceedings of the High-Level Design Validation and Test Workshop, pp. 111-118, 2006.

Hsiou-Wen and Eder, "Test directive generation for functional coverage closure using inductive logic programming", In Proceedings of the High-Level Design Validation and Test Workshop, pp. 11-18, 2006.

Kalla et al., "POWER7: IBM's next-generation server processor", IEEE Micro, 30(2):7-15, 2010.

A. Mackworth, "Consistency in Networks of Relations", Artificial Intelligence, 8(1):99-118, 1977.

Mishra and Dutt, "Automatic functional test program generation for pipelined processors using model checking", In Seventh Annual IEEE International Workshop on High-Level Design Validation and Test, pp. 99-103, Oct. 2002.

Wagner et al., "Microprocessor verification via feedback-adjusted Markov models", IEEE Transactions on Computer-Aided Design of Integrated Circuits and Systems, 26(6):1126-1138, Jun. 2007.

\* cited by examiner

SOLVING CONSTRAINT SATISFACTION PROBLEMS HAVING LOOSELY INTERCONNECTED SUB-PROBLEMS

TECHNICAL FIELD

The present disclosure relates generally to solving Constraint Satisfaction Problem (CSP) and, more particularly to solving CSPs that comprise sub-problems which are loosely interconnected therebetween.

BACKGROUND

A CSP may be defined as a triplet $P=<V, D, C>$, involving a set of variables, $V=\{v_1, \ldots, v_n\}$, which take discrete values from their corresponding finite domains $D=\{D_{v1}, \ldots, D_{vn}\}$, and a set of constraints $C=\{C_1, \ldots, C_m\}$. A constraint is an entity that restricts the values of one or more variables it relates to. For example, a constraint may be $C1>C2+C3$. As another example, a constraint may be $(C1>C2)$ OR $(C3<C4$ AND $C1=5)$. The constraint may utilize arithmetic operators, logic operators, or the like. In some exemplary embodiments, constraints may be presented as first order logic formulas over the variables. Additionally or alternatively, a constraint may be given as a set of possible assignments to one or more variables, such as $(C1, C3)=\{(1,1),(2,2),(3,1)\}$ which may indicate that the two variables $C1$ and $C3$ can be both assigned the value 1, both assigned the value 2, or $C1$ may be assigned the value 3 and $C3$ may be assigned the value 1.

A solution to the CSP problem is a single assignment of each variable such that the value of the variable belongs to its corresponding domain, and all the constraints are satisfied.

One of the known solving techniques for CSP is Maintain Arc Consistency (MAC). MAC is described in Dechter R., "Constraint Processing" (USA) 2003, which is hereby incorporated by reference in its entirety. In the MAC paradigm, CSP is solved by repeatedly performing two steps: (1) propagation and (2) instantiation.

The propagation step comprises restricting the domain of the variables to valid alternatives based on the constraints. Given a formula and a set of variables values, a propagator reduces the domain of the variables, removing values that cannot be combined with any set of values from the other variables to satisfy the constraints. Propagation may be performed until a fixed point is reached and no additional propagation may be performed.

The instantiation step is performed after the propagation step reaches a fixed point. A variable is chosen and instantiated to a single value or a subset values out of its corresponding domain. As the instantiation is not directly implied from the CSP, in some cases, some instantiations cause the CSP to become unsolveable, and may be backtracked.

The manner in which instantiation is performed has an impact on solver efficiency and the time it takes for the solution to be determined. Heuristics may be applied to reduce the number of backtracks and to gain performance speed-up. Many different types of heuristics are known in the literature, such as selecting the variables based on an order defined by a constraint network or based on a manual definition by a user.

CSP solvers may be utilized in variety of fields, such as for example verification, automatic scheduling, resource allocation algorithms, reactive planning, or the like. Generally, CSP solver solves an NP problem, or under some constraints an NP-complete problem.

BRIEF SUMMARY

One exemplary embodiment of the disclosed subject matter is a computer-implemented method performed by a processor, the method comprising: automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly: propagating constraints of the abstract CSP to reduce domains of the abstract CSP; selecting a sub-problem to solve; solving the sub-problem; and updating the abstract CSP with values in accordance with the solution of the sub-problem; whereby, a solution to the formally defined problem is determined based on the solutions to the sub-problems.

Another exemplary embodiment of the disclosed subject matter is a computer-implemented method for test generation, the method is performed by a processor, the method comprising: obtaining a set of formal requirements that are to be held by a generated test, wherein the generated test comprises operations that stimulate a target system; automatically determining, based on the set of formal requirements, an abstract Constraint Satisfaction Problem (CSP) corresponding to requirements of the operations in the test, wherein the abstract CSP represents abstract versions of the operations; and repeatedly: propagating constraints of the abstract CSP to reduce domains of the abstract CSP; selecting an operation to generate; determining a concrete CSP corresponding to the selected operation, wherein the concrete CSP encodes substantially all aspects of the selected operation, wherein the concrete CSP further comprises abstract versions of other operations, thereby capturing an abstract variation of interconnections between the selected operation and the other operations; generating the operation based on a solution of the concrete CSP, wherein the solution is provided by a CSP solver; and updating the abstract CSP with values in accordance with the solution of the concrete CSP.

Yet another exemplary embodiment of the disclosed subject matter is a computerized apparatus having a processor, the processor being adapted to perform the steps of: automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly: propagating constraints of the abstract CSP to reduce domains of the abstract CSP; selecting a sub-problem to solve; solving the sub-problem; and updating the abstract CSP with values in accordance with the solution of the sub-problem; whereby, a solution to the formally defined problem is determined based on the solutions to the sub-problems.

Yet another exemplary embodiment of the disclosed subject matter is a computer program product comprising: a non-transitory computer readable medium retaining program instructions, which instructions when read by a processor, case the processor to performs the steps of: automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly: propagating constraints of the abstract CSP to reduce domains of the abstract CSP; selecting a sub-problem to solve; solving the sub-problem; and updating the abstract CSP with values in accordance with the solution of the sub-problem; whereby, a solution to the formally defined problem is determined based on the solutions to the sub-problems.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to solve a CSP. In some exemplary embodiments, the structure of a graph representing the CSP includes many tightly coupled sub-graphs that are interconnected in a relatively loose manner. It is desired to provide a method, apparatus and product for solving such CSP. Preferably, the solving technique is scalable over increased sizes of CSPs.

Another technical problem is to generate operations streams based on a desired scenario. The streams may be useful for testing a target device. Additionally or alternatively, the streams may be useful in the reactive planning domain. The desired scenario may be provided in a formal manner, such as a test template, or in a non-formal manner.

As an example only, a specific technical problem is the problem of generating processor-level test cases. Each of the instructions in the generated test is a tightly coupled sub-graphs in the CSP problem defined by the test generation. Constraints between instructions, such as that the first and third instruction access the same memory are connect the instruction in a relatively loose manner. Similarly, system transactions post a similar technical challenge.

One technical solution is to interleave between solving the CSP and an abstract variation thereof. The abstract variation may be of a reduced complexity, such as by abstracting the details of each sub-problem. Additionally or alternatively, the abstract variation may retain the relationships between the sub-problems or an abstract variation thereof.

In some exemplary embodiments, the abstract variation may be an abstract CSP. Constraints in the abstract CSP may be propagated to reduce domains until a fixed point is reached. Once a fixed point is reached, a sub-problem may be selected and solved. Optionally, the sub-problem is solved by determining a concrete CSP for the sub-problem and solving the concrete CSP, such as using a Maintaining Arc Consistency (MAC) algorithm or other CSP solving algorithm. The abstract CSP may be updated based on the solution of the concrete problem. This cycle of propagating and solving a sub-problem may be continued until all sub-problems are solved. Optionally, backtracking may be performed in case a solution of a sub-problem causes the CSP to be unsatisfiable. The solution may be revoked and an alternative solution may be determined.

In some exemplary embodiments, the concrete CSP may retain the relationship between the sub-problem and other sub-problems using a portion of the abstract CSP which is external to the sub-problem being solved. As an example, in case a first instruction is being determined, the relationship between the first instruction's operand and other instructions' operand may be retained in the level of detail provided for in the abstract CSP. In some exemplary embodiments, a cone of influence analysis from the sub-problem in the abstract CSP may be performed and all influenced portions of the abstract CSP may be copied into the concrete CSP.

Another technical solution may comprise instantiating variables in the abstract CSP that are required in order to determine the concrete CSP of the sub-problem. As an example, different types of instructions may yield different concrete CSP graphs. Therefore, the type of instruction may be determined before generating the concrete CSP for the specific type of instruction.

Yet another technical solution is to provide a scenario having loosely interconnected sub-problems in a form of a CSP, to solve the CSP by interleaving between solving the abstract CSP and concrete CSPs of sub-problems thereof, and based on the solution of the CSP to generate a scenario useful for testing.

One technical effect is that the disclosed subject matter is propagating down the stream constraints thereby a solution to a concrete CSP is also effected by constraints of other sub-problems that have not yet been solved.

Another technical effect is avoiding forcing unfeasible constraints on the sub-problems by the solution to the abstract CSP. Instantiations of the CSP may be performed with respect to specific sub-problem and not with respect to the abstract CSP. The abstract CSP is used to propagate constraints to the domains, while the refined non-abstract problems are used for instantiating.

Yet another technical effect is scaling better than prior art CSP solvers and being able to solve a relatively complex CSP with a reduced amount of resources in comparison to prior art solutions.

Figure 1:
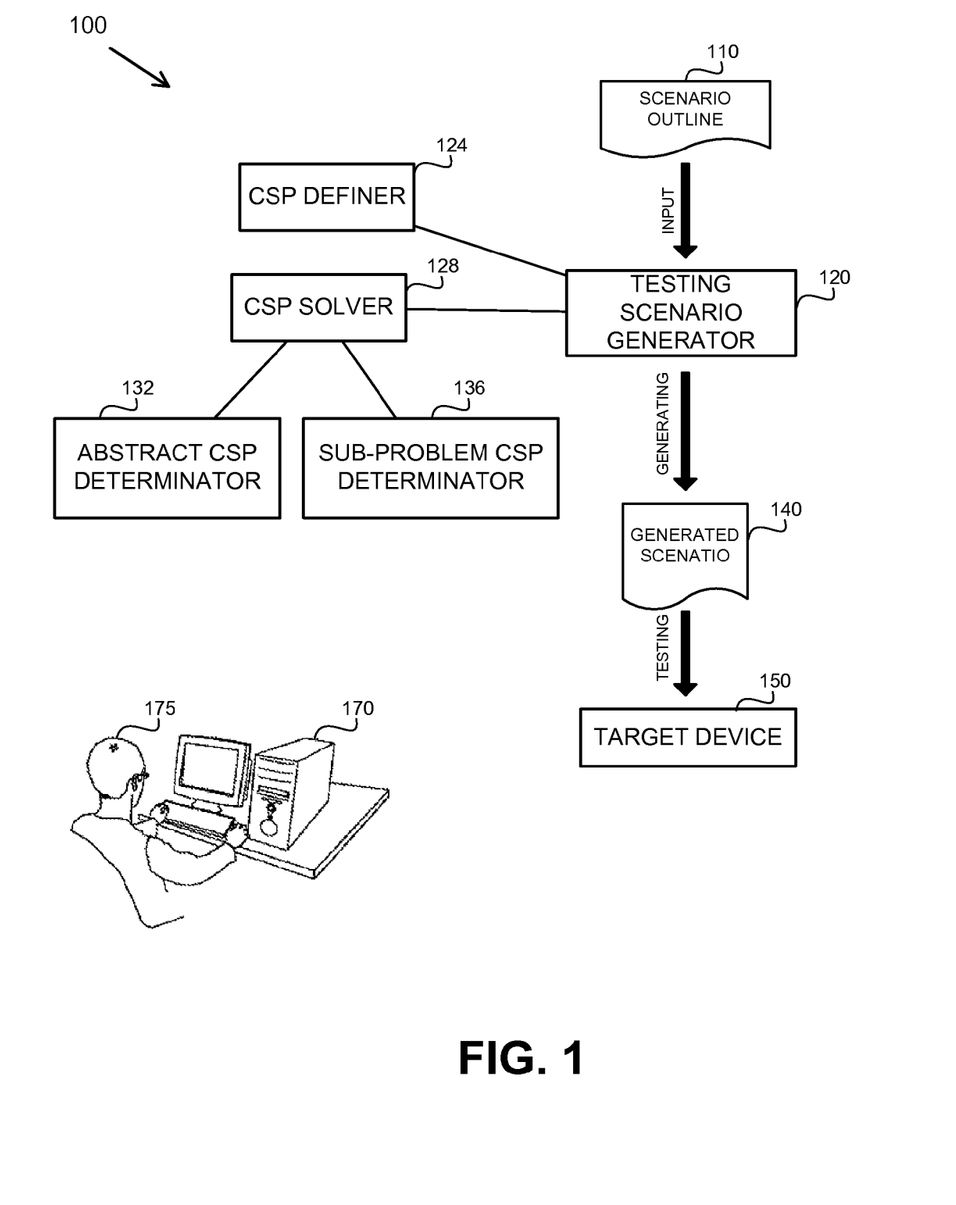
FIG. 1 shows an illustration of a computerized environment in accordance with the disclosed subject matter.

Referring now to FIG. 1 showing an illustration of a computerized environment in accordance with the disclosed subject matter. Computerized Environment 100 is being utilized by a User 175, such as a verification engineer, a Quality Assurance (QA) staff member, developer, or the like, for testing a Target Device 150. User 175 may utilize a Man-Machine Interface (MMI) 170, such as a terminal, a keyboard, a pointing device, a display, or the like, to interact with Computerized Environment 100.

A Scenario Outline 110, such as describing operations such as processor instructions, system transactions, event and reactions thereof, or the like, may be provided as an input to a Testing Scenario Generator 120 that is configured to generate a Generated Scenario 140 based on Scenario Outline 110. Scenario Outline 110 may define scenario elements in the scenario, constraints on the parameters of scenario elements, order between scenario elements, relations between properties of scenario elements, or the like. Generated Scenario 140 is in line with the Scenario Outline 110. Generated Scenario 140 may be utilized in testing, automatically, manually, or semi-automatically, a Target Device 150. It will be understood that Target Device 150 may be a hardware device, a software implemented tool, a protocol or implementation thereof, a reactive system, or the like.

Testing Scenario Generator 120 may be operatively coupled to a CSP Definer 124. The CSP Definer 124 is utilized to define a CSP based on Scenario Outline 110. The constraints of the CSP may be defined to ensure that the requirements in Scenario Outline 110 are met.

Testing Scenario Generator 120 may be operatively coupled to a CSP solver 128 operative to determine a solution to the CSP comprising assignment of values to the variables of the CSP, chosen from the variables' respective domains, such that all constraints of the CSP are held. CSP Solver 128 may be operatively coupled to Abstract CSP Determinator 132, which is operative to determine an abstract CSP corresponding to the CSP, but having a reduced complexity. CSP Solver 128 may be operatively coupled to Sub-Problem CSP Determinator 136, which is operative to identify separate sub-problems of the CSP.

In some exemplary embodiments, CSP solver 128 may be configured to solve the CSP by determining an abstract CSP and iteratively selecting a sub-problem thereof and solving the sub-problem (and not abstraction thereof). The abstract CSP may be updated based on the solution of the sub-problem, and implications thereof may be applied on the abstract CSP, such as by propagating the constraints to reduce domains of the abstract CSP. This iterative process may be performed until the CSP is solved.

Figure 2A:
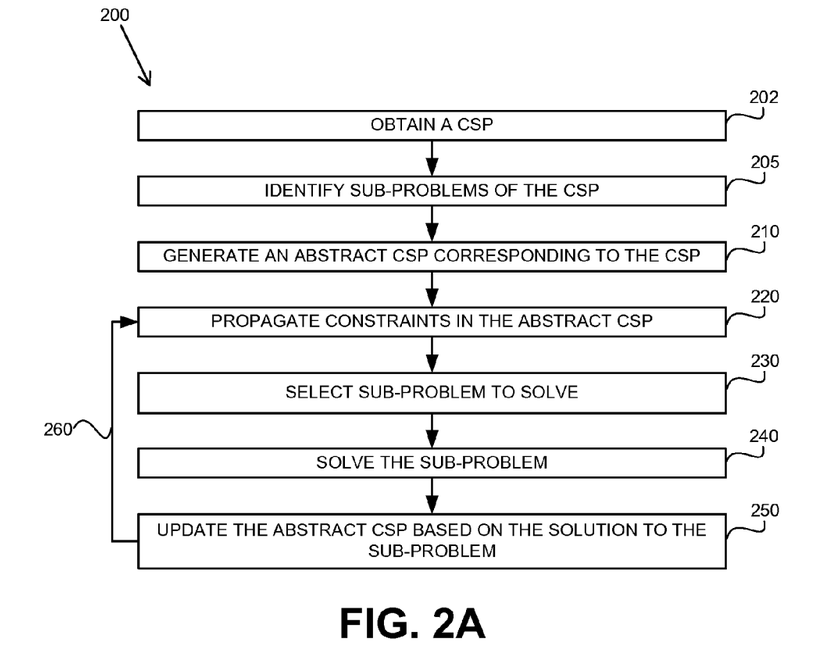
FIGS. 2A-2B show flowchart diagrams of steps in methods for solving a CSP, in accordance with some exemplary embodiments of the disclosed subject matter.

Referring now to FIG. 2A showing a flowchart diagram of steps in methods for solving a CSP, in accordance with some exemplary embodiments of the disclosed subject matter. Method 200 may comprise steps 202-260.

In Step 202, a CSP may be obtained. The CSP may define a problem having independent sub-problems. The sub-problems may be interconnected. In some exemplary embodiments, the sub-problems may be loosely interconnected. In some exemplary embodiments, step 202 may obtain the problem using a different formal definition, such as stream constraints or the like.

In some exemplary embodiments, a scenario may be defined by:
1) A set of scenario elements which can be generated one by one (e.g. class of processor instruction or system transactions);
2) Zero or more steam constraints which imply constraints between properties of the scenario elements;
3) Zero or more constraints on specific scenario elements;
4) Zero or more constraints on the order between the scenarios in the test.

As an example, in case of processor test generation, a stream constraints can include resource collision constraints (e.g., memory, caches, registers, or the like), general first order relations between scenario element properties, relations on the processor/thread id that the instruction is executed on, or the like.

For clarity of the disclosure, and without limiting the disclosed subject matter, the disclosure refers to the obtained problem as if it is provided in CSP form. It will be noted that the problem, even if not provided in CSP form, may be represented using a CSP representation. In some exemplary embodiments, the CSP representation may be inefficient and therefore may be avoided. For example, the problem may be a generation of test of a device. The test may include, for example, transactions to a system, instructions for a processor, or other similar operation stimuli. Each generated operation stimuli may be selected from a list of dozens or even hundreds of possible operations. Each such alternative possible operation may require different variables and constraints to represent the parameters of the operations and relationship therebetween and between them and other parameters. However, constraints of the problem may reduce substantially the number of legal operations to be generated (e.g., to a single possible operation or a set of limited number of operations). Therefore, and although that the problem may be represented using an explicit CSP, such representation may inefficiently comprise variables and constraints that are in actuality will not affect the solution. In some exemplary embodiments, it may be preferable not to generate the explicit CSP form.

In Step 205, sub-problems of the CSP may be identified. In some exemplary embodiments, a graph of the CSP may be generated, defining the connectivity between variables of the CSP as defined by the constraints. Strongly Connected Components (SCCs) in the graph may represent different sub-problems. In some exemplary embodiments, the sub problems are naturally defined by the formal input representation, for example the generation of each a specific instruction in a stream of instructions is natural partition of the CSP.

In Step 210, an abstract CSP corresponding to the CSP may be defined. In some exemplary embodiments, the abstract CSP may capture the constraints between the sub-problems in the original CSP. The abstract CSP can contain some of the CSP variables of the sub-problems or reflections thereof. As may be appreciated by a person of ordinary skill in the art, reduced complexity of the abstract CSP may be achieved from a reduction in number of variables, reduction in number of possible assignments thereof, or the like, these may be achieved due to utilizing a portion of the variables of the original CSP and/or abstract variables which relate to several variables in the original CSP. For example, in case of a CSP representing a set of processor instructions, where each instruction is a sub-problem, if the CSP includes constraints between two instructions' memory operands, the abstract CSP can include variables for the operand address that may be copied from the original CSP. Additionally or alternatively, the abstract CSP can also include a variable for write protection that is related to several variables in the original CSP.

In some exemplary embodiments, the structure of the abstract CSP may be similar to the structure of the original CSP in terms of including sub-problems that are connected by constraints.

In Step 220, constraints of the abstract CSP may be propagated to the domains of the variables. Propagation of the constraints may continue until a fixed-point is reached, such as when no additional domain may be reduced based on an analysis of the CSP itself. In some exemplary embodiments, Step 220 may be performed by an abstract CSP propagator.

In some exemplary embodiments, Step 220 may propagate the affects of constraints between the sub-problems. Specifically, it may propagate the down the stream constraints up. For example, if the second instruction in the stream cannot be write-protected and it uses the same address as the first instruction in the stream, Step 220 may propagate this constraint to the first instruction causing the translation of the shared address to be write-enabled. On the other hand, as Step 220 is restricted to propagating constraints and not to instantiation, no decisions that make the concrete sub-problems unfeasible are made based on the abstract CSP.

In Step 230, a sub-problem may be selected. In some exemplary embodiments, the sub-problem may be selected at random, based on a heuristic, according to a predetermined order, or the like. In some exemplary embodiments, an order between sub-problems may be imposed by the semantic of the problem. For example, in processor-level test generation, the order between sub-problems (i.e., instruction to be generated) may be the program order between the instructions.

In Step 240, the selected sub-problem may be solved. The sub-problem being solved may be the concrete sub-problem and not its corresponding abstraction in the abstract CSP. The selected sub-problem may be solved using any type of CSP solving technique, such as MAC, brute force enumeration, stochastic methods or the like. Additionally or alternatively, the sub-problem may be solved analytically, or using a non-CSP manner.

In Step 250, and based on the solution of the sub-problem, the abstract CSP may be updated. Based on one or more concrete values of concrete variables associated with the sub-problem, an abstract value of an abstract variable may be determined, and the abstract CSP may be updated accordingly.

In case not all sub-problems are solved, Loop 260 may be performed and steps 220-250 may be performed again. If all sub-problems are solved, their solution may be combined to provide a satisfying solution to the CSP.

In some exemplary embodiments, a sub-problem cannot be solved. Backtracking may be performed in response to such determination to revoke a previous solution that may have caused the sub-problem to be unsatisfiable.

Figure 2B:
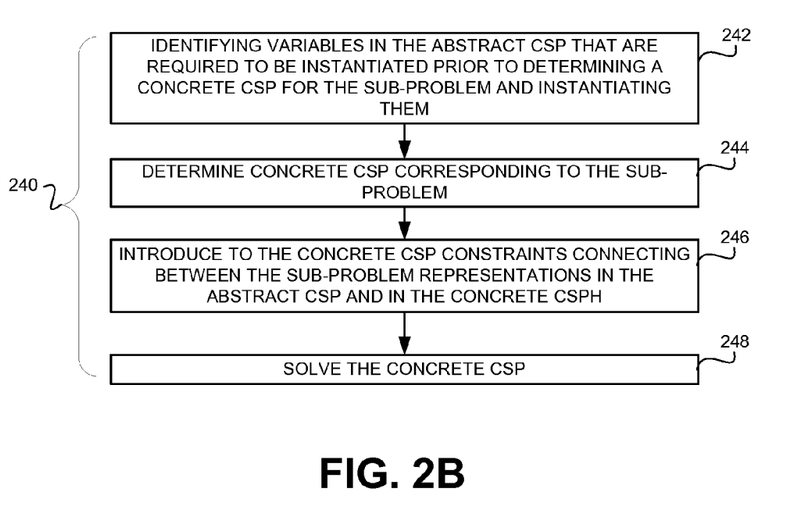

Referring now to FIG. 2B showing a flowchart diagram of steps in methods for solving a CSP, in accordance with some exemplary embodiments of the disclosed subject matter. FIG. 2B shows steps that may be taken when performing step 240 of FIG. 2A.

In Step 242, variables in the abstract CSP that need to be instantiated prior to solving a sub-problem may be identified and instantiated, such as using MAC algorithm. As an example, the abstract CSP may include variables for the mnemonic of instructions in the sub-problem, while the actual sub-problems may not include such variables, but be based on the specific mnemonic of instruction being generated. Though the sub-problem may be viewed as a disjunction of all possible different types of instructions, for efficiency purposes, the instruction may be generated only after selecting which type of instruction is to be generated. Step 242 enables such selections prior to solving the sub-problem. It will be noted that Genesys-Pro™, IBM® tool described in A. Adir et al., "Genesys-Pro: innovations in test program generation for functional processor verification", IEEE Design & Test of Computers, March-April 2004, 84-93, which is hereby incorporated by reference in its entirety, generates an instruction after being provided its desired mnemonic. Step 242 enables utilization of such tools in solving the sub-problem.

In Step 244, a concrete CSP for the sub-problem may be determined. The concrete CSP may be extracted from the CSP obtained in step 202. Additionally or alternatively, the concrete CSP may be generated on-the-fly based on the sub-problem. Other manners of determining the concrete CSP may be utilized.

In Step 246, constraints connecting between the different representations of the sub-problem may be introduced to the concrete CSP. The constraint may tie between variables of the concrete CSP and corresponding variables of the abstract CSP. In some exemplary embodiments, a copy of the abstract CSP is introduced to the concrete CSP. Additionally or alternatively, only a portion of the abstract CSP which is affected or affects the sub-problem may be introduced to the concrete CSP. The portion may be identified based on a cone of influence analysis.

As may be appreciated, the introduced constraints of Step 246 may capture the relation between the abstract CSP and the concrete sub-problem CSP. Thereby, propagation of information from the abstract CSP to the concrete CSP may be achieved. It will be noted, that in some embodiments, other methods of propagating the initial information between the abstract CSP and the concrete CSP may be utilized.

Additionally or alternatively, due to the presence of the portion of the abstract CSP that is external to the sub-problem but connected thereto, the solution of the concrete CSP may take into account effects on other sub-problems, as reflected by the abstract CSP.

In Step 248, the concrete CSP may be solved, such as using a CSP solver.

Figure 2C:
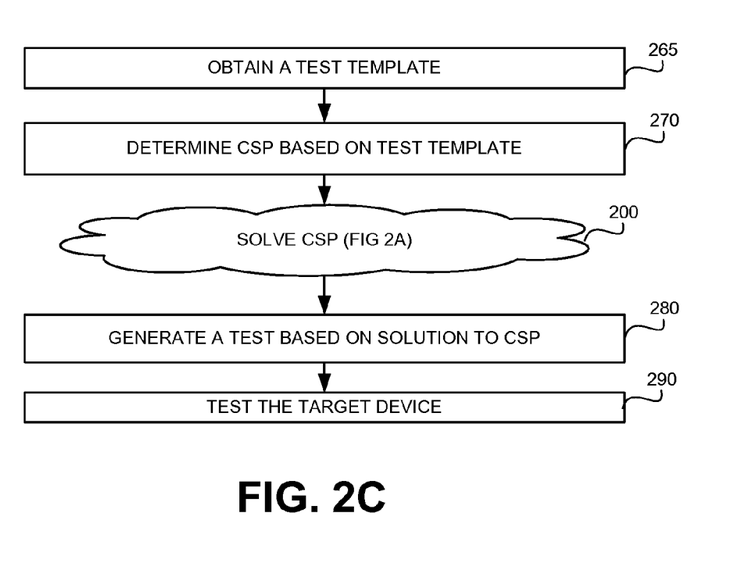
FIG. 2C shows a flowchart diagram of steps in a method for testing a target device using CSP solving, in accordance with some exemplary embodiments of the disclosed subject matter.

Referring now to FIG. 2C showing a flowchart diagram of steps in a method for testing a target device using CSP solving, in accordance with some exemplary embodiments of the disclosed subject matter. A test template may be obtained (265), the test template may be utilized to define a CSP (270) having interconnected sub-problems. The CSP may be solved, such as by Method 200. Based on the CSP solution, a concrete test, which is in line with the requirements of the test template may be generated (280) and the target device may be tested using thereof (290).

Figure 3:
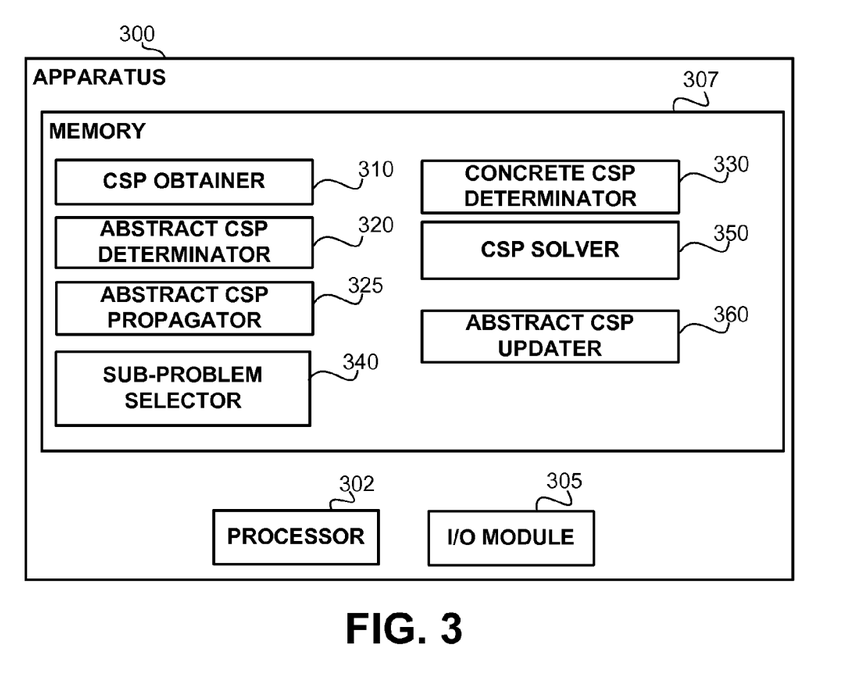
FIG. 3 shows a block diagram of components of a computerized apparatus, in accordance with some exemplary embodiments of the disclosed subject matter.

Referring now to FIG. 3 showing a block diagram of components of an apparatus useful for CSP solving, in accordance with some exemplary embodiments of the disclosed subject matter. An Apparatus 300 may be a computerized apparatus adapted to perform a method such as depicted in any of FIGS. 2A-2C.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, I/O Module 305 may be utilized to provide an interface to a user (not shown), such as 175, which may utilize an MMI (not shown), such as 170, to interact with Apparatus 300, such as by reviewing results, logs and the like, providing commands, rules, preferences, formulas or the like, or interacting in any similar manner.

In some exemplary embodiments, Apparatus 300 may comprise a Storage Device 307. Storage Device 307 may be persistent or volatile. For example, Storage Device 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Storage Device 307 may retain program code operative to cause Processor 302 to perform acts associated with any of the steps shown in FIG. 1 and/or FIGS. 2A-2C above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A CSP Obtainer 310 may be configured to obtain a CSP, such as obtain a CSP from a file, over a communication channel, or from other external sources. Additionally or alternatively, CSP Obtainer 310 may be configured to define a CSP based on a given problem, such as for example constructing one or more CSPs associated with a test template. CSP Obtainer 310 may be configured to perform Step 202.

An Abstract CSP Determinator 320 may be configured to determine an abstract CSP based on the CSP obtained by CSP Obtainer 310. Abstract CSP Determinator 320 may be configured to perform Step 210.

An Abstract CSP Propagator 325 may be configured to perform propagation on the abstract CSP. In some exemplary embodiments, propagation may be performed until a fixed point is reached and no additional domain reduction the flows from the abstract CSP may be performed. Abstract CSP Propagator 325 may be configured to perform Step 220.

A Sub-Problem Selector 340 may be configured to select one sub-problem to be solved from the plurality of possible sub-problems of the problem being solved. The selection may be made from the sub-problems in the Abstract CSP. Additionally or alternatively, the selection may be made from the sub-problems in the CSP. Sub-Problems Selector 340 may be configured to perform Step 230.

A Concrete CSP Determinator 330 may be configured to determine a Concrete CSP associated with a sub-problem. The concrete CSP may be determined based on the Abstract CSP. In some exemplary embodiments, the concrete CSP further includes the abstract CSP (i.e., its variables, constraints and domains) and values are propagated between variables of the abstract and concrete portions using designated constraints. In some exemplary embodiments, the concrete CSP includes only a portion of the abstract CSP. Concrete CSP Determinator 330 may be configured to perform Steps 244 and 246.

A CSP Solver 350 may be configured to solve a CSP. CSP Solver 350 may be a third-party CSP solver, an off-the-shelf tool, a dedicated tool, or the like. CSP Solver 350 may be useful in propagating constraints by reducing domains in the CSP. Additionally or alternatively, CSP Solver 350 may be useful in instantiating variables. In some exemplary embodiments, CSP Solver 350 may be utilized to solve the concrete CSP. In some exemplary embodiments, CSP Solver 350 may be useful in performing any of Steps 240, 248.

An Abstract CSP Updater 360 may be configured to update the Abstract CSP based on a solution of the sub-problem, such as a satisfying assignment in the concrete CSP associated with the sub-problem. Abstract CSP Updater 360 may be configured to perform Step 250.

Figure 4A:
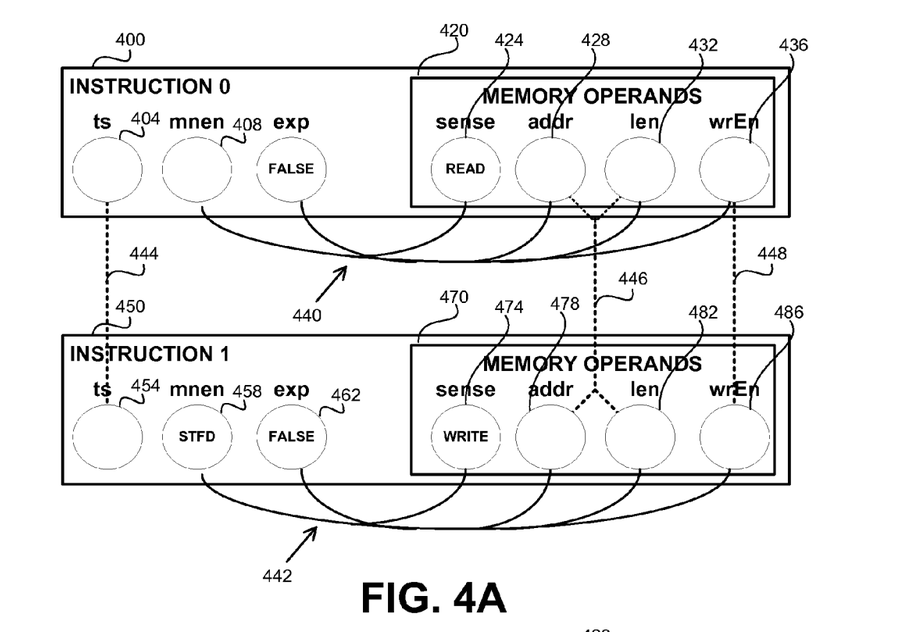
FIGS. 4A-4C show illustrations of abstract and concrete problems, in accordance with some exemplary embodiments of the disclosed subject matter.
Figure 4B:
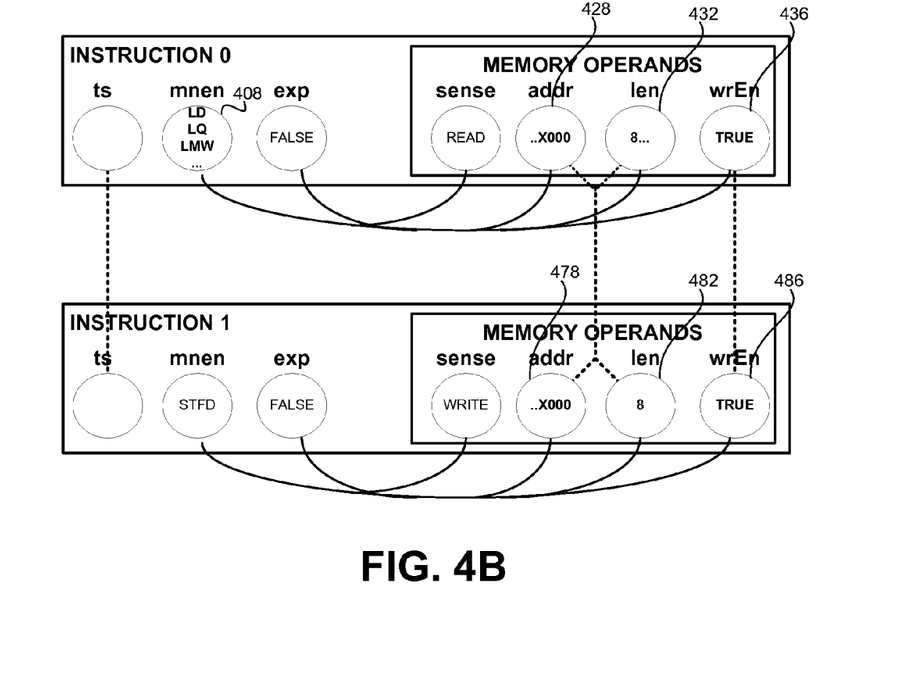
Figure 4C:
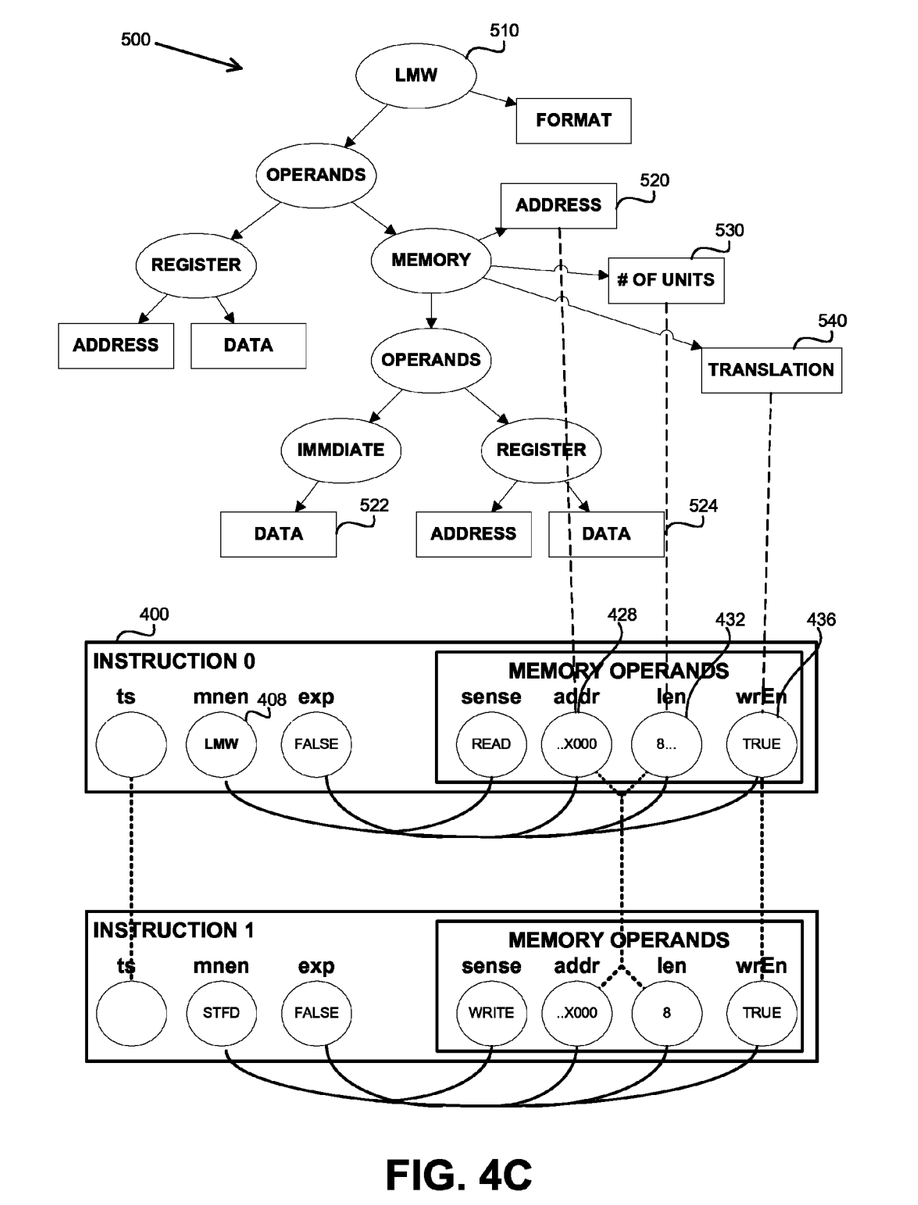

Referring now to FIGS. 4A-4C showing illustrations of abstract and concrete problems, in accordance with some exemplary embodiments of the disclosed subject matter. FIGS. 4A-4C show a problem of generating a scenario of read-after-write (RAW) collision in a Load Miss Queue (LMQ). The Load Miss Queue in a processor is a micro architectural mechanism that holds memory load accesses which missed the cache and are waiting to be fetched from memory.

In some exemplary embodiments, the scenario is defined as including two instructions. The first instruction needs to write to the LMQ. Because data read accesses to memory that miss in the L1 cache are written to the LMQ, this instruction needs to read data from memory. The second instruction needs to read from the LMQ, but not write to it. This means that the second instruction should write data to memory. Assume that the specification of the LMQ states that an interesting RAW collision occurs when the reader from the LMQ shares the same address as the writer and its data is fully contained in the writer data. In other words, the reader and writer have the same address and the reader access length is less than or equals to the writer access length. In addition to these requirements, there may be several other sources for requirements that affect the generated scenario. For example, exceptions clear the pipelines and buffers of the processor. Therefore, avoiding exceptions during the execution of the scenario is needed to allow interesting collisions in the LMQ. In addition, to achieve coverage closure, it may be more interesting if the scenario is generated such that the second instruction is a store floating-point double (stfd) instruction.

Examination of the requirements for the RAW scenario reveals several constraints they impose on the instructions in the scenario. To achieve a write to the LMQ, an instruction that reads from memory is required. Similarly, to fulfill collision requirements, the second instruction needs to write to memory. The coverage requirement specifies a specific instruction for the second instruction, namely stfd. This, in turn, adds several more constraints to the second instruction. First, the length of the memory access of the stfd instruction is eight bytes. In addition, to avoid exceptions, the memory access needs to be eight bytes aligned and the memory page the instruction accesses needs to be write-enabled. These constraints affect the first instruction as well. Because the collision requires the two memory accesses to the same address, the memory access of the first instruction also needs to be eight bytes aligned. In addition, the memory access of the second instruction needs to be fully contained in the first one, so the access length of the first instruction needs to be eight bytes or longer. Finally, because the two instructions access the same page in memory, this page needs to be write-enabled (even though the first instruction only reads from memory). All this results in many constraints on both the mnemonic of the first instruction (e.g., lbz, which reads a single byte from memory cannot be used because of the access length) and its operands (e.g., the eight byte alignment).

The constraints that propagate from the second instruction in the scenario to the first cause difficulties for stimuli generators that generate the instructions in the test program one by one, in their execution order.

FIG. 4A illustrates an abstract CSP model for the RAW collision in the LMQ. The collision scenario has two instructions (400, 450), leading to two sets of variables in the model. The left side of each instruction contains the fixed set of variables for the instructions. The collision scenario involves a memory collision. Therefore, a memory operand with several variables, such as address and length, is added to each instruction (420, 470). Note that instructions can have more than one operand attached to them and each instruction can have different operands. Additionally or alternatively, some instructions may not have any operands. For example, if the collision scenario also included a write-after-write (WAW) register collision between the second instruction and a new third instruction, the second instruction would have contained two operands, one memory and one register, and the third instruction would have contained only one register operand.

The constraints are added to the CSP model thereby constructing the stream CSP. These constraints are shown in FIG. 4A as edges (440, 442, 444, 446, 448). In some exemplary embodiments, there may be three types of constraints: intra-instruction constraints, scenario constraints, and order constraints. Intra-instruction constraints describe the relations between each mnemonic (e.g., 408, 458) and the rest of the variables in the instruction.

In some exemplary embodiments, intra-instruction constraints may be added for each instruction in the model and for each possible mnemonic. These constraints may be automatically extracted from the architectural specification of the processor. They may serve to remove infeasible mnemonics based on the values of the instruction variables and to set the value of the instruction variables when a specific mnemonic is given. For example, setting the memOp.sense value to READ will remove all the mnemonics of instructions that do not read from memory. With respect to stfd mnemonic (458), some intra-instruction constraints (442) may be, for example, memOp.len (482) being 8, memOp.sense (474) being WRITE, memOp.WrEn (486) being somehow connected with the value of exp (462), or the like.

In some exemplary embodiments, the scenario constraints are constraints that flow from the requirement of the scenario. These constraints may imply a relation between variables from two or more instructions. For example, the same-address fully-contained requirement of the LMQ RAW collision may appear in the stream model as a constraint (446) connecting the address (428, 478) and length (432, 482) variables of the two instructions. In addition to constraints that relate several instructions, the scenario requirements can also affect variables of individual instructions. For example, the scenario may require that the first instruction reads and the second instruction writes. These may be reflected as memOp.sense being READ for the first instruction (424) and WRITE for the second instruction (474).

In some exemplary embodiments, as the first and second instructions operate on the same memory address, their memOp.wrEn values (436, 486) should be the same, which may be reflected using an additional scenario constraint (448).

In some exemplary embodiments, order constraints may be implemented by introducing an ordering variable to each instruction, such as TimeStamp (ts) variables (404, 454) in FIG. 4A. An ordering variable may indicate an order of operation between the instructions and may be used to determine, for each two instructions, which of the instructions is performed first. Thus, ordering of the instructions may be achieved. For example, with respect to FIG. 4A, an ordering constraint (444) may enforce that the load instruction 400 be executed (and, for example, generated) before the store instruction (450) by indicating that ts 404 is smaller than ts 454.

In accordance with some exemplary embodiments of the disclosed subject matter, after the abstract CSP has been determined, constraints may be propagated in the abstract CSP. FIG. 4B illustrates the abstract CSP depicted in FIG. 4A after propagation. As can be seen in FIG. 4B the constraint propagation reduces the domains of the different variables.

For example, based on the second instruction being stfd, memOp.wrEn (486) may be set to TRUE. As a result of constraint 448 memOp.wrEn of the first instruction (436) may be set to TRUE as well. Similarly, the stfd instruction limits the value of memOp.len (482) to 8, as this instruction is operative to write 8 bytes to memory. Further, the address variable (478) is set to be 8 bytes aligned. Due to another constraint (446), the domains of the memOp.len and memOp.address of the first instruction (428, 432) may be reduced accordingly to assure that there is overlapping between the read instruction and the write instruction. As another example, mnem variable 408 may be reduced to a list of possible mnemonics based on memOp.wrEn being TRUE, based on the limitations on the memory address and length thereof, based on the instruction being operative to read (memOp.sense=READ), or the like.

As can be appreciated arc consistency on the scenario constraints updates the domains of the variables of the first instruction 400. For example, a constraint requiring same-address fully-contained relationship between the addresses affected by the two instructions sets the address of the first instruction to be eight bytes aligned and its length to be at least eight bytes. The intra-instruction constraints of the first instruction may filter out mnemonics that cannot participate as the first instruction in the scenario. For example, stfd cannot be the first instruction because it does not read from memory and lbz cannot participate because it reads just one byte. Therefore, both instructions (as well as many other) are removed from the domain of the first mnemonic (408). The ordering constraints reduce the domain of the timestamp of the second instruction to be greater than or equal to 2 because its timestamp needs to be greater than the timestamp of the first instruction.

Assuming that the first instruction is selected as the next sub-problem to be solved (e.g., due to it being order first, due to a random, stochastic, or heuristic decision, or the like), solving the sub-problem may be performed by generating a concrete CSP associated with the sub-problem. FIG. 4C illustrates such a concrete CSP, and its relation with the abstract CSP.

In some exemplary embodiments, some of the variables in the abstract CSP need to be set prior to generating the concrete CSP. As an example, the mnemonic variable may need to be set prior to generating the concrete CSP. In some exemplary embodiments, the value of the mnemonic variable 408 is set randomly, heuristically, or based on some other rule, to one of the values in its corresponding domain. FIG. 4C shows mnemonic lmw being selected. In some exemplary embodiments, the concrete CSP 500 is generated by a generator, such as Genesys-Pro™ tool.

The concrete CSP 500 may be configured to address all aspects of the instruction being generated. Hence, a solution thereof, is a solution of the sub-problem in its non-abstract form. For example, the data utilized by the instruction (e.g., 522, 524) may introduce additional complexity to the possible solution which was absent from the abstract CSP. Additional aspects of the sub-problem which may have been absent from the abstract CSP may be introduced in the concrete CSP.

As can be appreciated from the figure, in view of the mnemonic being lmw (510), variables and constraints may be defined. Furthermore, some variables of the concrete CSP may be connected with variables of the abstract CSP. For example, address (520) and number of units (530) variables may be constrained to be connected with the operands in the abstract CSP which relate to the memory address (namely, 428, 432). Similarly, translation variable (540) may be connected with the value of memOp.wrEn (436) in the abstract CSP.

It will be further noted that constraints in the concrete CSP, such as relating between the different data variables, different address variables, or the like, may be introduced.

As the concrete CSP 500 may be interconnected by some constraints to the variables of the first instruction 400 in the abstract CSP, when the concrete CSP 500 is being solved, such as by a CSP solver, the solution may take into account effects on the concrete CSP by other sub-problems (e.g., the second instruction), as well as effects by the concrete CSP on other sub-problems (e.g., the second instruction). Hence, the solution to the concrete CSP will not immediately render the abstract CSP unsolveable and therefore is not likely to require an immediate backtracking.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor, the method comprising:
   automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and
   repeatedly:
      propagating constraints of the abstract CSP to reduce domains of the abstract CSP;
      selecting a sub-problem to solve;
      solving the sub-problem; and
      updating the abstract CSP with values in accordance with the solution of the sub-problem;
   whereby, a solution to the formally defined problem is determined based on the solutions to the sub-problems.

2. The method of claim 1, wherein said solving the sub-problem comprises:
   determining a concrete CSP of the sub-problem based on the formally defined problem, wherein domains of the concrete CSP are based on the reduced domains of the abstract CSP; and
   solving the concrete CSP;
   whereby the solution of the formally defined problem is determined based on the solutions of the concrete CSPs.

3. The method of claim 2, wherein said determining the concrete CSP of the sub-problem comprises adding a portion of the abstract CSP which is external to the sub-problem and connected thereto.

4. The method of claim 3, wherein said adding comprises:
   introducing to the concrete CSP the abstract CSP and constraints connecting between representations of the selected sub-problem in the concrete CSP and the abstract CSP.

5. The method of claim 2, further comprising determining, in response to said propagating and selecting the sub-problem, whether a variable of the abstract CSP which is associated with the sub-problem is required to be assigned before said determining the concrete CSP, and instantiating the variable.

6. The method of claim 1, wherein said selecting a sub-problem to be solved comprises determining the sub-problem based on predetermined order of the sub-problems defined by the formally defined problem.

7. The method of claim 1, wherein the formally defined problem depicts at least one element stream, wherein the element stream is defined by a set of scenario elements which can be generated separately and a set of constraints on the scenario elements and relationship therebetween.

8. The method of claim 7, wherein a constraint on a relationship between two or more scenario elements defines one of the items selected of the group consisting of:
   an order between the two or more scenario elements; and
   a relation between properties of the two or more scenario elements.

9. The method of claim 7, further comprising: generating a testing scenario for a target computerized device by defining the formally defined problem and by generating the testing scenario based on the solution of the formally defined problem; and the method further comprising testing the target computerized device using the generated testing scenario.

10. The method of claim 9, wherein the testing scenario is selected from the group consisting of: a set of processor instructions, and a set of system transactions.

11. The method of claim 7, wherein the element stream is a stream of operations that stimulate a computerized device, wherein the scenario element is an operation, wherein each operation is a sub-problem, and wherein said selecting the sub-problem to solve comprises selecting an operation to generate for the stream based on order constraints between the operations.

12. A computer-implemented method for test generation, the method is performed by a processor, the method comprising:
   obtaining a set of formal requirements that are to be held by a generated test, wherein the generated test comprises operations that stimulate a target system;
   automatically determining, based on the set of formal requirements, an abstract Constraint Satisfaction Problem (CSP) corresponding to requirements of the operations in the test, wherein the abstract CSP represents abstract versions of the operations; and
   repeatedly:
      propagating constraints of the abstract CSP to reduce domains of the abstract CSP;
      selecting an operation to generate;
      determining a concrete CSP corresponding to the selected operation, wherein the concrete CSP encodes substantially all aspects of the selected operation, wherein the concrete CSP further comprises abstract versions of other operations, thereby capturing an abstract variation of interconnections between the selected operation and the other operations;
      generating the operation based on a solution of the concrete CSP, wherein the solution is provided by a CSP solver; and
      updating the abstract CSP with values in accordance with the solution of the concrete CSP.

13. The computer-implemented method of claim 12, wherein the operations are selected from the group consisting of: system transactions and processor instructions.

14. A computerized apparatus having a processor, the processor being adapted to perform the steps of:
   automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly:
    propagating constraints of the abstract CSP to reduce domains of the abstract CSP;
    selecting a sub-problem to solve;
    solving the sub-problem; and
    updating the abstract CSP with values in accordance with the solution of the sub-problem;
whereby, a solution to the formally defined problem is determined based on the solutions to the sub-problems.

15. The computerized apparatus of claim 14, wherein solving the sub-problem comprises:
    determining a concrete CSP of the sub-problem based on the formally defined problem, wherein domains of the concrete CSP are based on the reduced domains of the abstract CSP; and
    solving the concrete CSP;
whereby the solution of the formally defined problem is determined based on the solutions of the concrete CSPs.

16. The computerized apparatus of claim 15, wherein determining the concrete CSP of the sub-problem comprises adding a portion of the abstract CSP which is external to the sub-problem and connected thereto.

17. The computerized apparatus of claim 16, wherein adding comprises:
    introducing to the concrete CSP the abstract CSP and constraints connecting between representations of the selected sub-problem in the concrete CSP and the abstract CSP.

18. The computerized apparatus of claim 14, wherein the formally defined problem depicts at least one element stream, wherein the element stream is defined by a set of scenario elements which can be generated separately and a set of constraints on the scenario elements and relationship therebetween.

19. The computerized apparatus of claim 18, wherein the element stream is a stream of operations that stimulate a computerized device, wherein the scenario element is an operation, wherein each operation is a sub-problem, and wherein the selecting the sub-problem to solve comprises selecting an operation to generate for the stream based on order constraints between the operations.

20. A computer program product comprising:
    a non-transitory computer readable medium retaining program instructions, which instructions when read by a processor, cause the processor to perform the steps of:
        automatically determining an abstract CSP based on a formally defined problem having interconnected sub-problems, wherein the abstract CSP corresponds to the problem, wherein the abstract CSP has a reduced complexity in comparison to a CSP representing the problem, wherein the abstract CSP captures the interconnection between the sub-problems and reduces the details of each sub-problem, wherein the abstract CSP comprises constraints over variables, wherein each variable having an associated domain; and repeatedly:
    propagating constraints of the abstract CSP to reduce domains of the abstract CSP;
    selecting a sub-problem to solve;
    solving the sub-problem; and
    updating the abstract CSP with values in accordance with the solution of the sub-problem;
whereby, a solution to the formally defined problem is determined based on the solutions to the sub-problems.

* * * * *